United States Patent
Ucar et al.

(10) Patent No.: US 12,094,273 B2
(45) Date of Patent: Sep. 17, 2024

(54) SYSTEMS AND METHODS TO IMPROVE THE PERFORMANCE OF ANOMALY DETECTION

(71) Applicant: TOYOTA MOTOR ENGINEERING & MANUFACTURING NORTH AMERICA, INC., Plano, TX (US)

(72) Inventors: Seyhan Ucar, Mountain View, CA (US); Emrah Akin Sisbot, Mountain View, CA (US); Kentaro Oguchi, Mountain View, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 298 days.

(21) Appl. No.: 17/680,050

(22) Filed: Feb. 24, 2022

(65) Prior Publication Data

US 2023/0267782 A1    Aug. 24, 2023

(51) Int. Cl.
*G07C 5/08* (2006.01)
*B60W 50/02* (2012.01)

(52) U.S. Cl.
CPC ......... *G07C 5/085* (2013.01); *B60W 50/0205* (2013.01); *G07C 5/0816* (2013.01)

(58) Field of Classification Search
CPC .. G07C 5/085; G07C 5/0816; B60W 50/0205
See application file for complete search history.

(56) References Cited

U.S. PATENT DOCUMENTS

| | | |
|---|---|---|
| 9,988,059 B2 | 6/2018 | Satomura |
| 10,589,664 B2 | 3/2020 | Kashchenko |

(Continued)

FOREIGN PATENT DOCUMENTS

| | | |
|---|---|---|
| CN | 110816543 B | 4/2021 |
| FR | 3107875 A1 | 9/2021 |

OTHER PUBLICATIONS

Lin et al., "An Overview on Study of Identification of Driver Behavior Characteristics for Automotive Control," Mathematical Problems in Engineering 2014, Mar. 17, 2014, 15 pages (https://doi.org/10.1155/2014/569109).

(Continued)

*Primary Examiner* — James J Lee
*Assistant Examiner* — Steven Vu Nguyen
(74) *Attorney, Agent, or Firm* — SHEPPARD, MULLIN, RICHTER & HAMPTON LLP; Daniel N. Yannuzzi

(57) ABSTRACT

Systems and methods are provided for improving the performance of anomaly detection, including detecting abnormal driving behavior at locations and in driving situations where the accuracy of detecting abnormal driving behavior has decreased or known to cause inaccurate performance responses. For example, the anomaly detection mechanism may detect abnormal driving behavior (e.g., delayed responses, road rage, swerving, etc.) or environmental anomalies (e.g., potholes, fallen trees, etc.), and particular driving situations or locations can have repeatedly shown decreased rates of accuracy with responding to these anomalies, including abnormal driving behavior (e.g., delayed driver responses to left-turns, U-turns, traffic light, railroad crossing, construction zones, etc.) or situations that are known to cause inaccurate performance responses (e.g., potholes, fallen trees, etc.). Embodiments can revise the anomaly detection system to operate the vehicle more consistently with other human drivers.

32 Claims, 7 Drawing Sheets

(56) References Cited

U.S. PATENT DOCUMENTS

| | | |
|---|---|---|
| 2011/0106376 A1 | 5/2011 | Tijerina |
| 2014/0046701 A1* | 2/2014 | Steinberg |
| 2020/0207358 A1* | 7/2020 | Katz .................. G02B 27/0093 |
| 2023/0025414 A1* | 1/2023 | Ma .................. B60W 60/00188 |
| 2023/0089020 A1* | 3/2023 | Nemmani ............... H04W 4/44 |
| | | 709/217 |

OTHER PUBLICATIONS

Zohrevand et al., "Should I Raise the Red Flag? An Analytic Review of Anomaly Scoring Methods toward Mitigating False Alarms," Apr. 14, 2019, 11 pages (https://arxiv.org/abs/1904.06646).

Hundman et al., "Detecting Spacecraft Anomalies Using LSTMs and Nonparametric Dynamic Thresholding," KDD '18: Proceedings of the 24th ACM SIGKDD International Conference on Knowledge Discovery & Data Mining, pp. 387-395, Jul. 19, 2018 (https://doi.org/10.1145/3219819.3219845).

\* cited by examiner

SYSTEMS AND METHODS TO IMPROVE THE PERFORMANCE OF ANOMALY DETECTION

TECHNICAL FIELD

The present disclosure relates generally to anomaly detection, and in particular, some implementations may relate to improving the performance of a vehicle in response to detecting an anomaly (e.g., abnormal driving behavior detection or environmental condition) that may be associated with a particular location or situation.

DESCRIPTION OF RELATED ART

Anomalies in driving behavior or abnormal driving behavior (used interchangeably) can occur as a result of aggressive driving, such as tailgating or lane-cutting; distracted driving, such as swerving or delayed driver reactions; or reckless driving, such as green light running or changing lanes without signaling. The anomalies should be detected by vehicles accurately. Otherwise, it jeopardizes safety of the vehicle and other vehicles. However, detection of anomalies is challenging due to numerous factors including locations and situation dependence. These factors cause performance degradation. Systems are needed to address such issues and prevent the accidents caused by anomalies in standard driving maneuvers or the driving environment.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
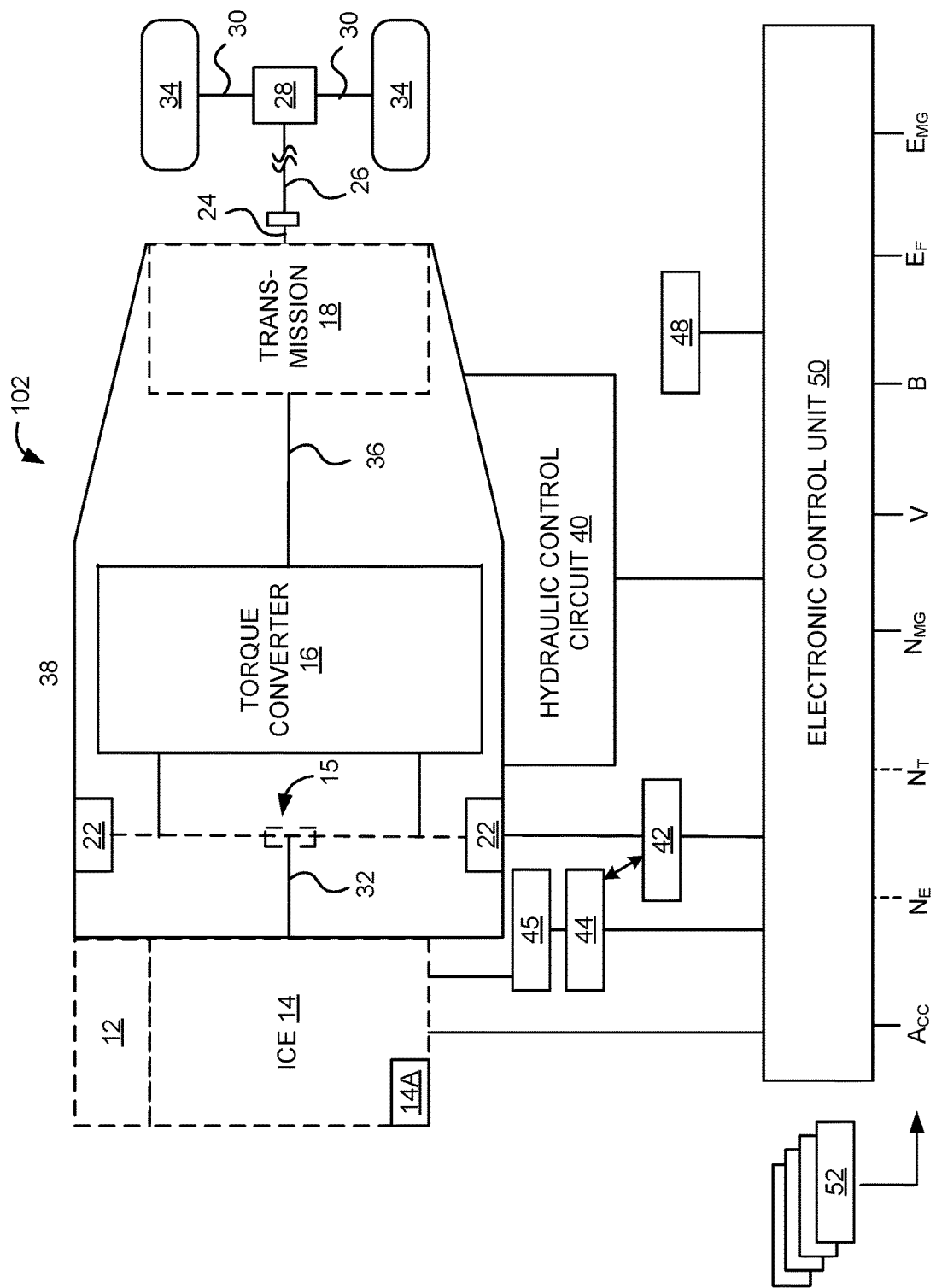
FIG. 1 is a schematic representation of an example vehicle with an anomaly detection system.

The figures are not exhaustive and do not limit the present disclosure to the precise form disclosed.

DETAILED DESCRIPTION

Embodiments of the present disclosure can improve conventional systems for performing anomaly detection, including detecting abnormal driving behavior at locations and in driving situations where the accuracy of detecting abnormal driving behavior has decreased or known to cause inaccurate performance responses. In various embodiments, the anomaly detection system may improve the anomaly detection mechanism based on refining the detection logic. For example, the anomaly detection mechanism may detect abnormal driving behavior (e.g., delayed responses, road rage, swerving, etc.) or environmental anomalies (e.g., potholes, fallen trees, etc.). In some examples, the anomalies may be identified in driving situations or at locations that have repeatedly shown decreased rates of accuracy by the anomaly detection system in responding to these anomalies, including abnormal driving behavior (e.g., delayed driver responses to left-turns, U-turns, traffic light, railroad crossing, construction zones, etc.) or situations that are known to cause inaccurate performance responses (e.g., potholes, fallen trees, etc.). When the anomaly detection system is updated to detect the decreased performance and revise an anomaly detection rule, the vehicle can provide suggestions to a human driver when these or other anomalies are detected or, when automated driving functionality is activated, may operate the vehicle more consistently with other human drivers. The vehicle overall may operate well in environments that are typically identified as corresponding with abnormal driving behavior or other anomalies, when in actuality the behavior is normal and safe.

Illustrative examples of these environments are found in various locations and situations. As a few illustrative examples, these environments that are typically identified as corresponding with abnormal driving behavior even though the driving behavior is normal can include locations at traffic signals, U-turns, railroad crossings, or intersections. The systems and processes described herein can improve the detection and suggestion performance of the anomaly detection system at such locations and in such driving situations by observing parameters and rules that instruct dynamic threshold value and range adjustment in conventional anomaly detection mechanism, and adjusting the observed parameters and rules. By improving the detection of anomalies, the anomaly detection system can help to better manage automated vehicles and/or a driver's actions in the vicinity of abnormal driver (e.g., distracted driver), abnormal situation, or other anomaly. Additionally, the improved system may improve overall vehicle performance of the vehicle and/or systems by maintaining accurate detection and suggestions for responding to anomalies in driving behavior and the environment throughout vehicle operation.

The improved system can also help to gain trust of the driver. For example, if the system identifies a vehicle's operations as abnormal but the vehicle is not actually acting abnormally, the driver may ignore future suggestions provided by the system and lose trust in the system overall. Or, if the system identifies vehicle operation as normal but it is actually abnormal (e.g., unsafe), the vehicle that is operating abnormally may cause an accident and becomes a threat for other drivers.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principles disclosed herein may also extend to other vehicle types as well.

Regarding the aforementioned conventional systems, these systems can attempt to detect anomalies in driving behavior or the environment, but often suffer from issues related to accuracy, detection time (e.g., how early the system can detect the abnormal behavior or other issues), false positives, and false negatives. In other examples, the conventional systems can be trained to detect and abate danger caused by anomalies, which can include intersections, U-turn signals, or abnormal driving behavior, like aggressive driving, distracted driving, or reckless driving, or other detectable driving situations.

Some conventional systems can monitor driving behavior and categorize whether driving actions are normal or abnormal using a series of sensors and vehicle systems. For example, some systems can compare measurements taken by the sensors to determine whether actions of the vehicle are normal or abnormal when the measurement value exceeds a threshold value or range. In other examples, the systems may warn the driver or suggest a lane change in response to an anomaly detected by the system, but the human driver may understand that it is not abnormal driving behavior and ignore it. This is a case where the performance of anomaly detection systems is decreased. These systems can also or alternatively identify parameters, behavior classification rules, or location data (herein collectively "metadata") as indications of anomalies. When the anomaly is detected, the systems may trigger an alarm to the driver or, when automated driving is available, may adjust the operation of the vehicle (e.g., lane change, evasive maneuver, etc.).

Other situations may be implemented for addressing abnormal driving behavior in non-dangerous situations. For example, a sensor in a vehicle may monitor how long the vehicle waits before accelerating. When the threshold value for the sensor is three seconds and the vehicle does not begin accelerating within that time, the abnormal driving behavior system may identify that the operation of the vehicle is abnormal.

In general, conventional systems identify vehicles operating within threshold values or ranges as normal, and vehicles operating outside the threshold values or ranges as abnormal. Anomaly detection mechanisms typically are accurate at locations and in situations with commonly followed driving detection rules. For example, on highways, vehicles typically operate at relatively similar speeds and with relatively similar distances between vehicles. In this example, the threshold values and ranges can be discretely set to allow for consistent vehicle operation on the highway. Automated vehicle systems can measure distances between the vehicle that is being monitored ("ego vehicle") and other vehicles, as well as speed, acceleration, road conditions, sensor metadata, and/or other vehicle or environment information, and can do so under consistent conditions (i.e., most highways are generally uniform: certain width, certain number of lanes, certain speed limit, certain density of cars per road space). In this manner, systems can detect abnormal driving behavior whether the actions are performed by the ego vehicle driver or other, surrounding, non-ego vehicles.

Conventional anomaly detection mechanisms may allow for changing or adjusting threshold values or ranges through the implementation and incorporation of machine learning systems. Machine learning systems implemented into an anomaly detection mechanism may allow for dynamic threshold values or ranges based on changing driver preferences, location, environmental conditions, and/or similar varying circumstances. For example, when a driver is operating their vehicle at night or in areas of poor visibility, the threshold values or ranges for how far a proceeding car should be from the ego vehicle may be extended. In this example, the standard threshold value may be a 3 second follow distance (distance between ego vehicle and non-ego vehicle; 3 second being the distance a car could cover in 3 seconds at the speed its currently operating at). However, in low-light conditions, the anomaly detection mechanism with machine learning may adjust the threshold value to 4 seconds to allow additional time to account for abnormal driving, and in response to low visibility of the driver.

Further, the machine learning model may have preprogrammed threshold values or ranges that are further trained using observation data to determine weights and biases that can associate the observation data provided as input to the machine learning model in order to generate output (e.g., clusters or groupings) and a confidence score. To improve the conventional training, the amount of observation data may be increased. This may be helpful when determining additional weights and biases or more triggering factors found in the observation data. Almost all anomaly detection mechanisms have this method executed through a feedback mechanism, where the feedback mechanism triggers the model update (e.g., threshold value and range), and the anomaly detection model is updated for improved performance.

The anomaly detection mechanism with machine learning is conventionally instructed using the combination of two sets of machine-readable instructions: anomaly detection and behavior interference. First, anomaly detection may occur when a system collects observations of driver behavior to establish threshold values and ranges, which act in combination with a system that detects abnormal driving behavior (or other anomaly) to determine if the threshold values or ranges are exceeded. The combination of these features produces an anomaly detection mechanism that is capable of detecting when abnormal driving behavior occurs. Second, behavior interference occurs when an anomaly detection mechanism acts in combination with a behavior classification system, such that particular actions of a driver are given behavior classifications, which are subsequently given weights and biases when incorporated into the adjustment of threshold values and ranges. The combination of anomaly detection and behavior interference produces a system that provides notifications to drivers and third-parties when a driver engages in abnormal driving behavior (i.e., exceed threshold values and ranges, even when the values are ranges are adjusted via machine learning models).

One issue with conventional anomaly detection mechanisms is that the machine learning models are maintained and adjusted to form new models, based on observed data that may change in a manner more rapidly than the model can be updated. This makes subsequent models constructed with the previous trend inconsistent, if they are modelling from a non-refined model. This inaccuracy and decreased performance of the anomaly detection may increase the rate of false positives and subsequently produce more false alarms inside the vehicle, or other means of decreasing performance of the anomaly detection model. Despite feedback mechanisms being able to capture this in the long term, by standardizing and refining models, feedback mechanisms take time to standardize and refine the overall system and update the anomaly detection model, creating problems for drivers when using systems in everyday life. In particular locations, such as traffic signals, intersections, turn lanes, and U-Turns have proven to be locations where the conventional anomaly detection mechanisms have decreased levels of accuracy. Such that the threshold values and ranges are more likely to inaccurately trigger a false reading of anomaly detection.

One issue with precise isolating boundaries is that the threshold values and ranges may be insufficient alone because the thresholds can change according to observed anomalies that may decrease performance of the anomaly detection system over time. Such an approach can also cause a masking effect in which some of the abnormal points are marked as normal due to dynamic thresholds. For example, a driver who regularly operates their vehicle on dirt roads may have dynamic thresholds that are modelled on lower speeds and further distances between vehicles, thus when they drive on a highway, the thresholds are constantly exceeded, causing false positives and false alarms. Moreover, this approach may be vulnerable to attacks that can increase or decrease the thresholds by injecting false data.

More generally, the anomaly detection mechanism alone can show decreases in performance because they may focus on anomaly detection and behavior classification in general. For example, abnormal driving behavior occurs in greater proportions at certain locations and during certain situations, such as at traffic lights, intersections, railroad crossing, U-turns, left turns, and vehicles in traffic. Regardless, the conventional anomaly detection system may perform equally in regular situations as well as at locations known to higher rates of decreased levels of performance. This can cause a decrease in abnormal driving behavior detection performance because the vehicle may continuously mischaracterize attributes consistently relevant to the situation or may produce false alarms that provoke an autonomous response system in a vehicle when the response in unnecessary. Due to these mischaracterizations, the anomaly detection mechanism may show greater confidence scores, while producing less accurate anomaly detection. Thus, a system for improving the performance of anomaly detection, in particular, at locations and situations known to cause false and inaccurate performance responses, is needed.

An example vehicle in which embodiments of the disclosed technology may be implemented is illustrated in FIG. 1. Although the example described with reference to FIG. 1 is a hybrid electric vehicle (HEV), the systems and methods to improve the performance of anomaly detection can be implemented in other types of vehicle including gasoline-powered or diesel-powered vehicles, fuel-cell vehicles, fully electric vehicles, or other modern vehicles with memory, computation, and communication capabilities.

FIG. 1 illustrates a drive system of a vehicle 102 that may include an internal combustion engine (ICE) 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 102 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 102 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motor power in vehicle 102 and is powered electrically via a battery 44. Battery 44 may be implemented as one or more batteries or other power storage devices including, for example, lead-acid batteries, lithium ion batteries, capacitive storage devices, and/or similar. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle 102. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit 40. When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

Figure 2:
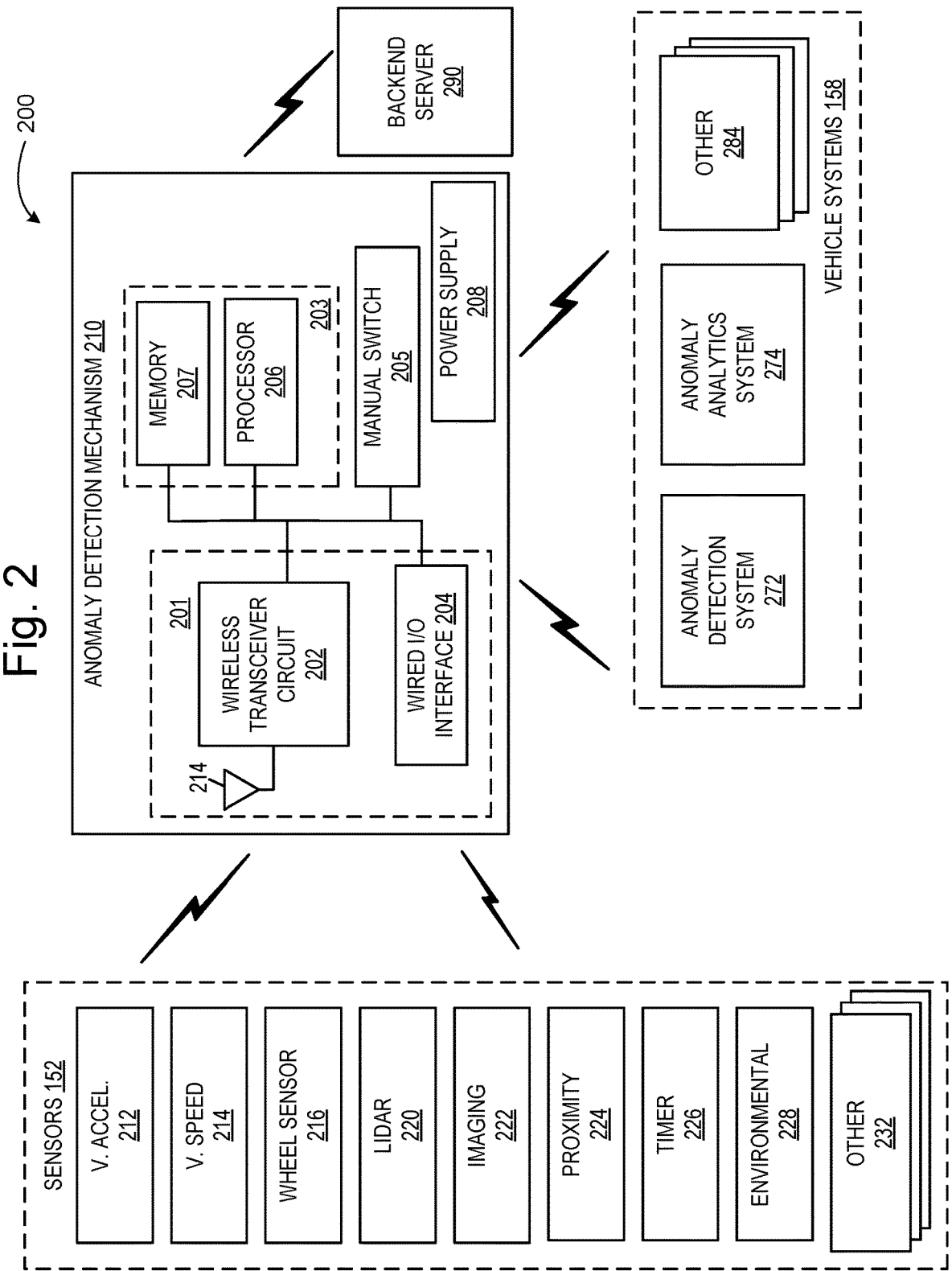
FIG. 2 illustrates an anomaly detection system in communication with a backend system, in accordance with some embodiments described herein.

In the example illustrated in FIG. 1, electronic control unit 50 receives information from a plurality of sensors included in vehicle 102 and nearby vehicles, as further described with FIG. 2. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$; motor efficiency, $E_{MG}$; hybrid (internal combustion engine 14+MG 12) efficiency; acceleration, Acc; etc. In other embodiments, sensors 52 may include LiDAR or automotive LiDAR sensors; radar or automotive radar sensors; cameras or automotive vision; oxygen sensors or automotive oxygen sensors; pressure sensors or automotive pressure sensors; ultrasonic or automotive ultrasonic sensors; temperature sensors; proximity sensors; rain sensors; current sensors; image sensors; speed sensors; parking sensors; humidity sensors; backup sensors; reverse sensors; airflow sensors; intake air temperature sensors; knock sensors; crankshaft/camshaft position sensors; throttle position sensors; manifold absolute pressure sensors; fuel pressure sensors; nox sensors; exhaust temperature sensors; boost pressure sensors; and/or similar.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, LiDAR or other vehicle proximity sensors, and cameras or other image sensors. Image sensors can be used to detect, for example, traffic signs indicating a current speed limit, road curvature, obstacles, traffic signals, turn lanes, street signs encouraging or prohibiting turns or U-turns, and/or similar. Still other sensors may include those that can detect road grade, road condition (e.g., rain, snow, etc.). While some sensors can be used to actively detect passive environmental objects, other sensors can be included and used to detect active objects such as those objects used to implement smart roadways that may actively transmit and/or receive data or other information.

The example vehicle illustrated in FIG. 1 is provided for illustration purposes only as an example of a vehicle system with which embodiments of the disclosed technology may be implemented. One of ordinary skill in the art reading this description will understand how the disclosed embodiments can be implemented with vehicle platforms.

FIG. 2 illustrates an anomaly detection system in communication with a backend system, in accordance with some embodiments described herein. Anomaly detection system 200 installed with the vehicle may comprise anomaly detection mechanism 210, a plurality of sensors 152, and a plurality of vehicle systems 158. Anomaly detection system 200 may also be in communication with a backend server 290 and be back in server may communicate directly with one or more vehicles.

In some examples, the components of backend server 290 may be incorporated with anomaly detection system 200 installed within the vehicle and the vehicle may communicate directly with other vehicles, rather than remotely with backend server 290, which then corresponds with the vehicles. For example, the communication network may incorporate a vehicle-to-everything (V2X) communications protocol with cloud/roadway infrastructure, which facilitates communication between a vehicle and any entity that may affect, or may be affected by, the vehicle.

Sensors 152 and vehicle systems 158 can communicate with anomaly detection mechanism 210 via a wired or wireless communication interface 204. Although sensors 152 and vehicle systems 158 are depicted as communicating with the anomaly detection mechanism 210, they can also communicate with each other as well as with other vehicle systems, as well as, external servers that are not located on the vehicle, including backend server 290. The anomaly detection mechanism 210 can be implemented as an electronic control unit (ECU) or as part of an ECU such as, for example, electronic control unit 50. In other embodiments, the anomaly detection mechanism 210 can be implemented independently of the ECU.

The anomaly detection mechanism 210 in this example includes a communication circuit 201, a computing system 206, a manual switch 205, and a power supply 208. Components of the anomaly detection mechanism 210 are illustrated as communicating with each other via a data bus, although other communication interfaces can be included.

Manual switch 205 is configured to change between standard driving mode and abnormal driving behavior detection mode. Manual switch 205 can be operated by the user to manually select whether to engage the anomaly detection mechanism 210 in abnormal driving behavior detection mode. In some examples, manual switch 205 may be removed from implementation of vehicle 200 such that anomaly detection mechanism 210 can constantly run in background or intermittently (or automatically) activated. The activation of anomaly detection mechanism 210 may be based on driver preferences or inferred knowledge of the system (e.g., vehicle is approaching to U-turn where the performance is predicted to decreased and the system may automatically activate to improve the performance).

Computing system 203 is configured to store initial functionality of anomaly detection mechanism 210 (e.g., anomaly detection rules, parameters, driving patterns, threshold values, evasive maneuvers that the driver may perform, driver compliance rate when the driver is given a control suggestion, etc.). The initial functionality may be used to form the threshold values and ranges, communicate with a backend system 290, and receive and analyze data to determine adjustments to the anomaly detection rules and parameters based on the analysis. Computing system 203 can include a CPU, microprocessor, or any other suitable processing system, illustrated as processor 206. Computing system 203 may include one or more various forms of memory or data storage (e.g., flash, RAM, etc.) that may be used to store the parameters (e.g., calibration parameters, images (analysis or historic), point parameters), instructions and variables for computing system 203, threshold values and ranges, as well as any other suitable information, illustrated as memory 207. Computing system 203, can be made up of one or more modules of one or more different types of memory, and may be configured to store data and other information as well as operational instructions that may be used by the anomaly detection mechanism 210.

Although computing system 203 is illustrated using computing system circuitry, as described below with reference to circuits disclosed herein, computing system 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the anomaly detection mechanism 210.

Communication circuit 201 is configured to send and receive data from sensors 152, vehicle systems 158, anomaly detection mechanism 210, and backend system 290. Communication circuit 201 includes either or both a wireless transceiver circuit 202 with an associated antenna 214 and a wired I/O interface 204 with an associated hardwired data port (not illustrated). As this example illustrates, communications with the anomaly detection mechanism 210 can include either or both wired and wireless communications circuits 201.

In various embodiments, communication circuit 201 can be configured to receive data and other information from sensors 152 that are used in determining whether to revise the anomaly detection rules and parameters via anomaly detection system 200. Additionally, communication circuit 201 can be used to send an activation signal or other activation information to various vehicle systems 158 as part of activating the anomaly detection system 200 or distributing revised anomaly detection rules.

Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked, or otherwise.

Antenna 214 is coupled to wireless transceiver circuit 202 and is used by wireless transceiver circuit 202 to transmit radio (RF) signals wirelessly to wireless equipment with which it is connected and to receive RF signals as well. These RF signals can include information of almost any sort that is sent or received by the anomaly detection mechanism 210 to/from other entities such as sensors 152, vehicle systems 158, and/or backend system 290.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 208 can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or any other suitable power supply.

Backend system 290 may run one or more digital simulations using metadata received from one or more vehicles to improve abnormal driving detection situations. The backend system 290 may also store a database of abnormal driving behavior incidents based on location for multiple cars, so when a vehicle connected to the database approaches a location of known decreased accuracy of abnormal driving behavior detection, the backend system will notify the vehicle to adjust for anomaly detection rules, parameters, and thresholds specific to the given location or situation known to cause inaccurate performance responses. In some examples, the database may comprise locations or situations of decreased performance of anomaly detection rules, where the abnormal driving detection mechanism may detect that the vehicle performance is abnormal, but the determination by the anomaly detection system is often inaccurate (e.g., known to cause inaccurate performance responses).

In some examples, backend system 290 may create a database or model to demonstrate expected normal driving behavior, and the anomaly detection mechanism 210 may compare the driving behavior of the driver with driving behavior identified by the backend system 290 to determine whether the driving behavior is normal.

Sensors 152 can include, for example, sensors 52 such as those described above with reference to the example of FIG. 1. Sensors 152 can include additional sensors that may or not otherwise be included on vehicle 102 with which the anomaly detection system is implemented. In the illustrated example, sensors 152 include vehicle acceleration sensors 212, vehicle speed sensors 214, wheelspin sensors 216 (e.g., one for each wheel), a LiDAR or radar sensor 220, imaging sensors and/or processors 222, proximity sensors 224, timers 226, and environmental sensors 228 (e.g., to detect temperature or other environmental conditions). Additional sensors 232 can also be included as may be appropriate for a given implementation of the anomaly detection system 200.

Vehicle systems 158 can include any of a number of different vehicle components or subsystems used to control or monitor various aspects of the vehicle and its performance. In this example, the vehicle systems 158 include anomaly detection system 272, anomaly analytics system 274, and other systems 284.

Anomaly detection system 272 is configured to implement anomaly detection logic that may be responsible for detecting the anomaly which is determined to be abnormal driving behavior. For example, anomaly detection system 272 is configured to determine a location of a vehicle, which may correspond with a common location that an anomaly is detected. Anomaly detection system 272 can use the Global Navigation Satellite System (GNSS) network to provide information on location, vehicle speed, time, and/or direction of the vehicle.

Anomaly detection system 272 is also configured to receive proximity data 224 or location data from other sources to determine the geographic position of the vehicle. Anomaly detection system 272 may monitor sensors 152 and vehicle systems 158, then compare the monitored data to known models of environmental features to determine the presence of features surrounding the vehicle (e.g., traffic signals, turn lanes, U-turn signs).

Anomaly detection system 272 is also configured to monitor and control the direction of front/rear wheels, as well as distribution of power among the vehicle wheels such as, for example, by controlling front/rear and left/right torque split. In some examples, anomaly detection system 272 can control or monitor vehicle driving turns (e.g., left turn, U-turn, etc.).

Anomaly detection system 272 is also configured to monitor vehicles sensor (e.g., LiDAR 220) to determine vehicle position/presence at intersection, and further control the operation of engine (e.g. internal combustion engine 14) when at an intersection. In some examples, anomaly detection system 272 is configured to monitor vehicle surroundings (e.g., imaging 222, proximity 224, environmental 228) to determine if the vehicle is at an intersection, such as a four-way traffic light.

Anomaly analytics system 274 is configured to collect metadata related to a detected anomaly and transmit it to backend server 290. Backend server 290 may analyze the metadata from one or more vehicles, including vehicle 200, to help infer reasonable knowledge to improve the performance of anomaly detection for a plurality of vehicles. For example, the anomaly detection can be time series analysis of sensor data or running machine learning algorithm on the observed data (e.g., sensor data, metadata, etc.), as described herein.

Anomaly analytics system 274 is also configured to compare sensor and vehicle system data to threshold values and ranges to determine whether operations of the ego vehicle or non-ego vehicle are abnormal (i.e., driver not watching the road, driver's hands not on the steering wheel, swerving, stopping at a green light, leaving too much space between vehicles, etc.).

Anomaly analytics system 274 is also configured to observe sensors 152 and vehicle systems 158 to determine whether a driver's actions fall within two categories: normal driving behavior (i.e., within threshold values or ranges) or abnormal driving behavior (i.e., exceeding threshold values or ranges).

Anomaly analytics system 274 is also configured to compare a list of driver behaviors that are predetermined to be normal with received sensor data or other driver behaviors. When the received list of driver behaviors is distinguishable from the list of normal driver behaviors, the driver behaviors may be identified as abnormal driving behaviors. If the driver behaves against a learned or determined normalcy (i.e., exceeded threshold values or ranges), it may be marked as abnormal behavior. These marked abnormal driving behaviors are then further analyzed by abnormal driving analytics 278 and the abnormal driving behavior can be placed in a conditional classification. For example, one conditional behavior classification is: if a driver has a delayed response for more than a 1.5-2 seconds threshold, then the driver is inattentive or distracted, i.e., abnormal. In various embodiments, the anomaly detection mechanism 210 could adjust the threshold values or ranges to account for said driving behavior. For example, if a driver is particularly agile and has a quick response, this does not mean the driver is aggressive or behaving abnormally. Therefore, an anomaly detection mechanism 210 conventionally performance would adjust the classification so as to not trigger the anomaly detection mechanism the next time the driver behaves in this manner.

However, such conditional classifications do not always adjust correctly at certain locations and in certain situations because conventional abnormal driving behavior mechanisms, even when operating accurately, suffer from decreased performance at certain locations and in certain situations. These environmental situations are detected using anomaly detection system 272. For example, some people are agile, while others are slow when responding to traffic lights. In such locations or situations, even if the observed driving behavior is delayed and somehow abnormal, the driver may not be a distracted driver. In such a situation, anomaly detection mechanism 210 may still not adjust to different driver behavior, and as such, produce false alarms or false negatives/positives, which unnecessarily effect vehicle sensors 152, vehicle systems 158, and/or drivers. False negatives threaten the safety of innocent drivers, whereas false positives can cause unnecessary alarms to engage in a vehicle that overwhelm drivers and make them more prone to ignoring future alerts. The performance of anomaly detection mechanisms 210 is improved, especially in locations and situations where false negatives and false positives are common.

Anomaly analytics system 274 is also configured to monitor a database of geographic locations (e.g., located at backend system 290) to determine if the surrounding characteristics are indicative of problematic locations. These locations may be known to have decreased accuracy of anomaly detection mechanisms such as, for example, locations of traffic lights, U-turns, or intersections, and monitor sensors 152 and vehicle systems 158. The decision regarding what action to take at these locations can be made based on the information detected by sensors 152. Examples are described in more detail below.

In some examples, information associated with the database of geographic locations can be provided to anomaly analytics system 274 from backend system 290 (or surrounding vehicles) and anomaly analytics system 274 may perform this process by itself. In some examples, the plurality of vehicles can share or provide this information to backend system 290, in which metadata with backend server 290 may aggregate the data to determine the anomaly analytics. The inferred analytics by backend server 290 or anomaly analytics system 274 (e.g., problematic locations, modifications to anomaly detection rules, etc.) can be shared with the plurality of vehicles and/or backend server 290.

Anomaly analytics system 274 is also configured to learn and adjust anomaly detection rules based on problematic locations or situations that are known to cause inaccurate performance responses. For example, when a driver or vehicle performs the abnormal driving behavior detection operation at certain locations or in certain situations, anomaly detection system will only consider accuracy of the anomaly detection mechanism at the type of location or type of situation. By learning and adjusting rules, parameters, and thresholds specifically to the location, the anomaly detection system can account for unique or characteristic differences to the given location or situation that are known to cause inaccurate performance responses, which would otherwise skew the rules, parameters, and thresholds of the anomaly detection mechanism in general.

Anomaly analytics system 274 is also configured to execute location or situation specific anomaly detection rules, parameters, and thresholds in the abstract at certain locations or situations where the performance is degraded. By running these rules, parameters, and thresholds in the abstract, the vehicle's anomaly detection is improved at these distinct locations and situations that are known to cause inaccurate performance responses, and stored in vehicle memory for future operation at these locations or in these situations.

At these locations or situations, the anomaly detection rules can be dynamically changed to improve the overall performance. Performance may be adjusted by the autonomous or semi-autonomous drive system, Advanced Driver Assistance System (ADAS) systems, and/or any other vehicle system that controls movement of the vehicle. After monitoring the rules, parameters, and thresholds for the anomaly detection mechanism that are implemented at the location, some embodiments of the present disclosure may produce additional or invalidate existing anomaly detection rules, parameters, or thresholds, which govern anomaly detection, only at this location/situation or similar locations/situations.

Anomaly analytics system 274 is also configured to implement machine learning. For example, anomaly analytics system 274 is configured to receive a ground truth through a training process, e.g., implemented by anomaly detection system 272, detect the anomalies (abnormal driving behavior), and propagate the metadata to anomaly analytics system 274.

Anomaly analytics system 274 is also configured to collect the metadata regarding the detected anomaly and ensure the confidence score. If the driver behaves as expected in accordance with an action determined by anomaly analytics system 274 (e.g., implements a lane change suggestion), then the training of the machine learning model may correlate the suggestion and detected action. However, if the driver behaves against what is expected by anomaly analytics system 274 (e.g., the driver receives the suggestion as an anomaly detection and concludes that it is not anomaly, including that the anomaly is a false positive, then the driver rejects the suggestion), then the training of the machine learning model may determine that the suggestion and detected action are not correlated and update the ground truth of the machine learning model. The process may be repeated until the machine learning model reaches a threshold confidence score, where the accuracy of providing a suggestion at a particular location or in response to a particular situation (e.g., U-turn, intersection, etc.) is degraded.

The ground truth information can be transmitted as metadata to backend server 290. Backend server 290 may aggregate all metadata from multiple vehicles and determine commonalities within the received data. In some examples, the aggregated data may be provided to a digital twin simulation or trained machine learning model to determine additional inferences. When the additional inferences are determined, backend server 290 may modify the detecting logic using the analytics determined by the individual vehicles or the inferences determined from the aggregated data to improve the overall performance of suggestions provided to the plurality of vehicles.

Anomaly analytics system 274 is also configured to determine a confidence score corresponding with received metadata as input, where the higher the confidence score corresponds with the higher the likelihood that the metadata identifies a decreased accuracy of detecting abnormal driving behavior.

In some examples, anomaly analytics system 274 receives sensor data from sensors 152 or other monitor data (e.g., preprogrammed threshold values, threshold ranges) and compares the data with anomaly detection rules to determine a confidence score that identifies the likelihood that the driving behavior is abnormal. Anomaly analytics system 274 may adjust the weights and biases incorporated with the machine learning model that determines the confidence score (e.g., when the data consistently exceeds threshold values). By adjusting the confidence score, the confidence score may more accurately reflect the determination that the driving behavior is normal or abnormal.

In various embodiments, anomaly analytics system 274 may transmit sensor data, thresholds, adjusted or revised anomaly detection rules, or other information with backend system 290. In some examples, backend system 290 may implement anomaly analytics system 274 remotely from vehicle 102 and update the anomaly detection rules in accordance with the output of the trained machine learning model (or digital twin simulation, etc.).

Anomaly analytics system 274 is also configured to run parallel simulation environments using sensor input in order to determine different outputs based on the same data (e.g., digital twin simulation). For example, anomaly analytics system 274 may run one or more digital simulations or a digital twin simulation as a simulated environment that compares differing rules, parameters, and thresholds to a predicted abnormal driving incident and produces an adjusted set of anomaly detection rules, parameters, or thresholds to anomaly detection system, based on the result of the digital twin simulation with the higher confidence score. For example, when an ego vehicle approaches a U-turn and observes a vehicle behind the ego vehicle slow down and wait for the ego vehicle to turn, it may run a simulation where one response is to record the slowing of the vehicle as a response to the U-turn, and the other response is the vehicle is slowing based on abnormal driving; the recorded and implemented response will be first based on the vehicle being at a known U-turn.

The simulations may be performed using anomaly detection rules, parameters, and thresholds (input data) and produces adjusted anomaly detection rules, parameters, and thresholds (output data) based on a system that is trained to predict the output based on the received input data. For example, anomaly analytics system 274 can use the digital twin simulation to determine a distance that the vehicle will travel when the vehicle applies the brakes at a first location versus a second location, and use the distance determined in each digital simulation to make a determination of which output is preferred (e.g., safer, more efficient, quicker to stop the vehicle, etc.) given the input data. Further, the determined output may adjust the predicted normalcy of abnormal driving detection. In another example, the system can monitor a vehicle stopping at a green light to leave an intersection open, and determine that this is normal behavior based on continued incidents compared to known locations.

By running one or more simulations, anomaly analytics system 274 may adjust the anomaly detection rules based on the outcome of the simulations, thus improving the viability of the anomaly detection rules for future simulations.

Other vehicle systems 284 may be implemented as well. For example, other vehicle systems 284 can comprise vehicle cabin HVAC, efficiency systems, road condition systems, and/or similar.

Figure 3:
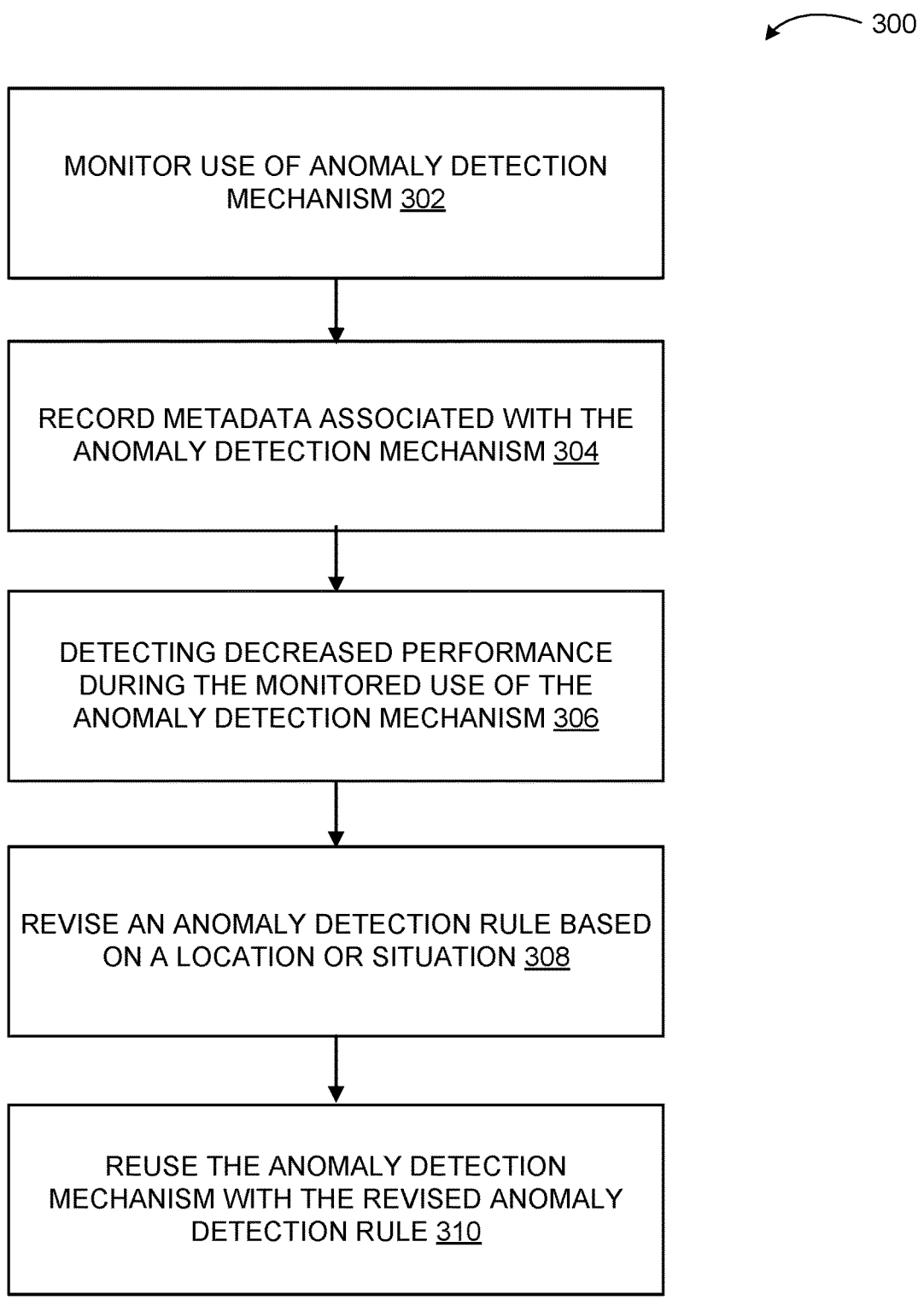
FIG. 3 provides an illustrative method for performing anomaly detection, in accordance with some embodiments described herein.
Figure 4:
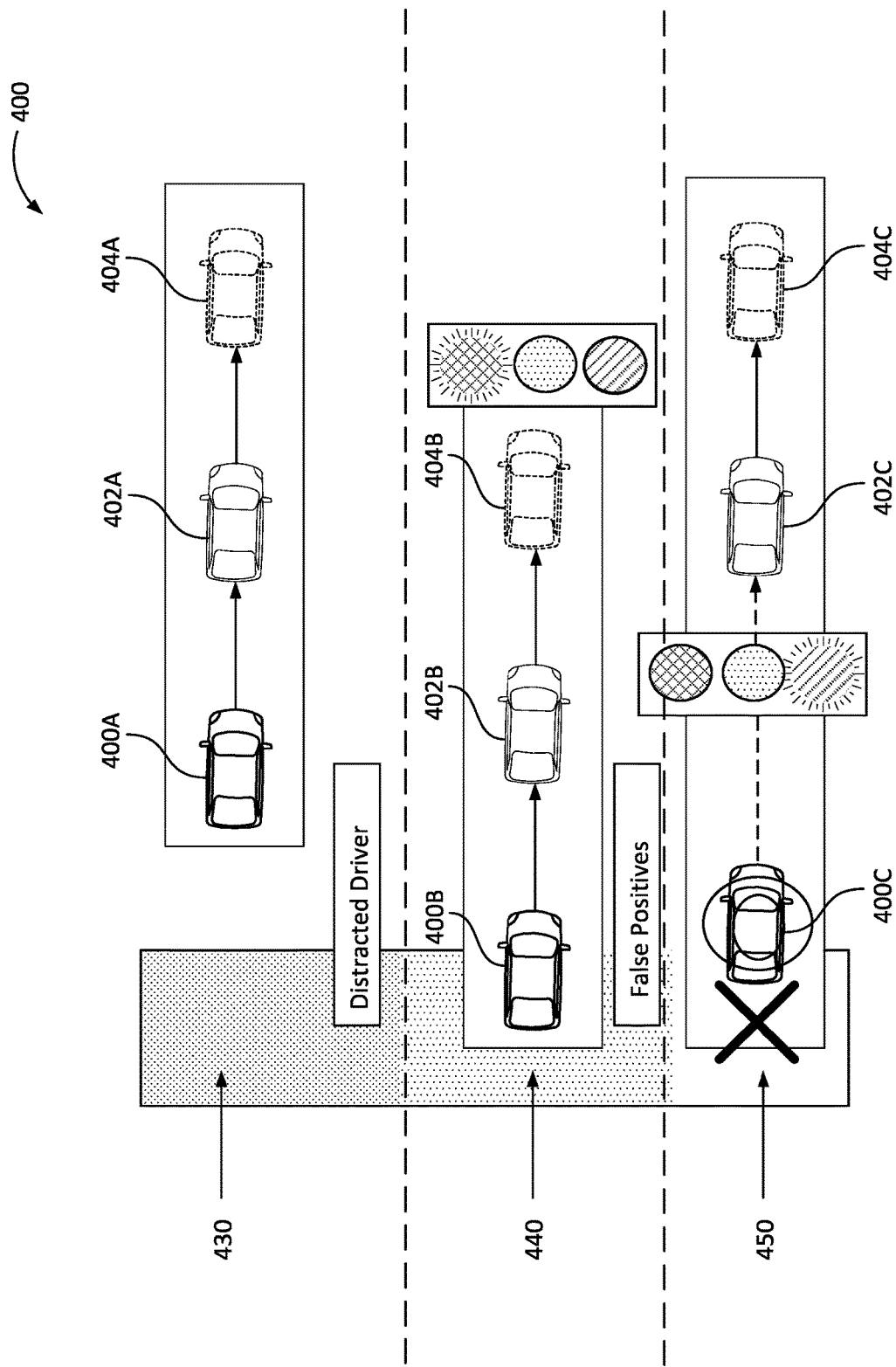
FIG. 4 provides an illustrative driving environment with a vehicle approaching a traffic signal, in accordance with some embodiments described herein.
Figure 5:
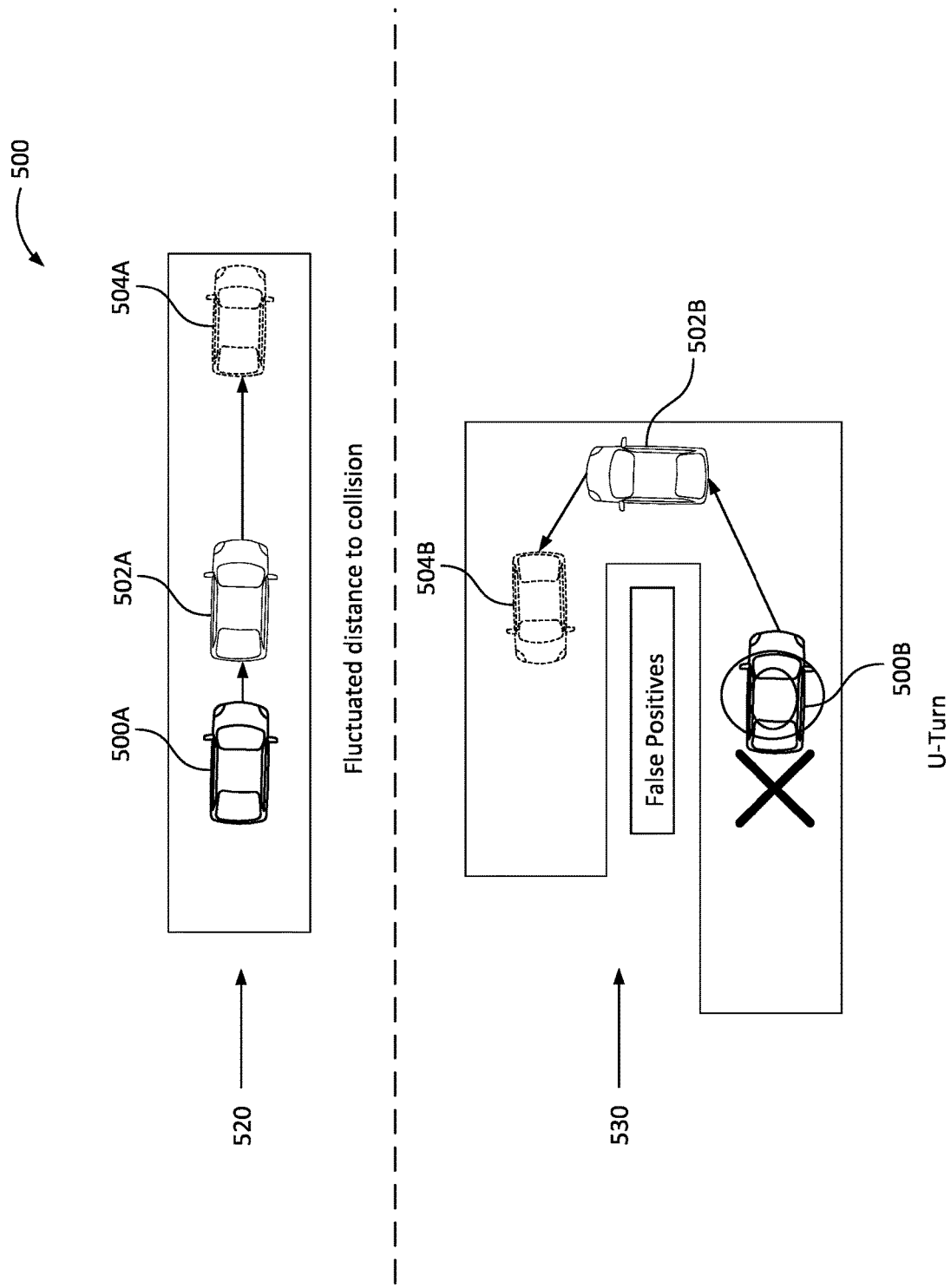
FIG. 5 provides an illustrative driving environment with a vehicle approaching a U-Turn opportunity, in accordance with some embodiments described herein.
Figure 6:
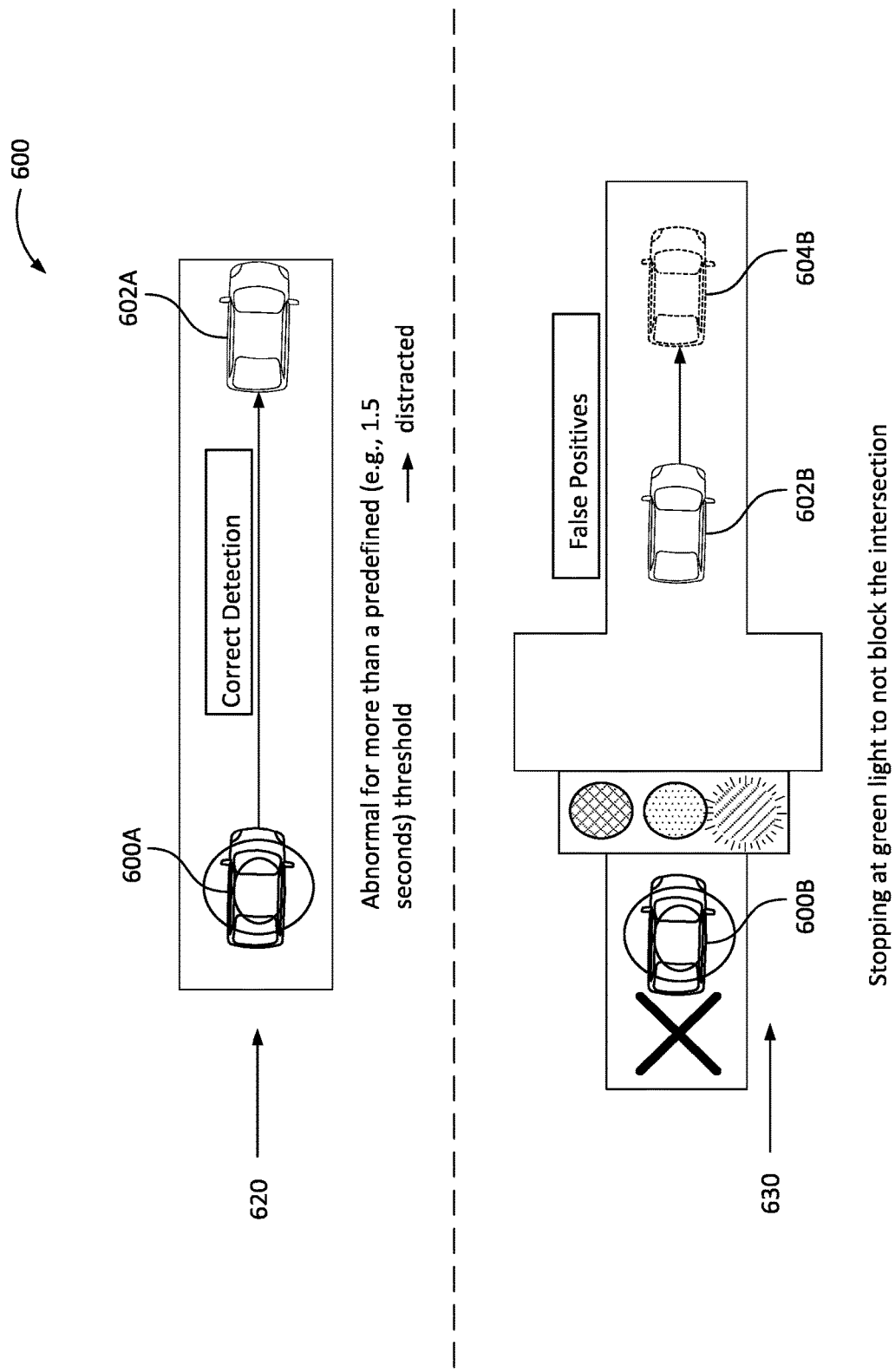
FIG. 6 provides an illustrative driving environment with a vehicle approaching an intersection, in accordance with some embodiments described herein.

FIG. 3 provides an illustrative method for anomaly detection, in accordance with some embodiments described herein. Vehicle systems 158 and sensors 152 may be implemented to help with anomaly detection using the process as illustrated in FIG. 3, in various environments, as illustrated in FIGS. 4-6. For example, FIG. 4 provides an illustrative driving environment with a vehicle approaching a traffic signal, FIG. 5 provides an illustrative driving environment with a vehicle approaching a U-Turn, and FIG. 6 provides an illustrative driving environment with a vehicle approaching an intersection, in accordance with embodiments discussed herein. In each of these illustrations, the location or the situation of the vehicle may be known to cause inaccurate performance responses from an anomaly detection system. The anomaly detection rule(s) may be revised by the anomaly detection system upon identifying the decreased performance of the anomaly detection system in these locations or situations.

In FIG. 4, three examples are illustrated, including 430, 440, and 450. In each of these examples 430, 440, and 450 of FIG. 4, the anomaly detection system 200 may be installed on ego vehicle 402 (illustrated as ego vehicle in the first example 402A, ego vehicle in the second example 402B, ego vehicle in the third example 402C). Anomaly detection system 200 can monitor sensors 152 and vehicle systems 158 on the ego vehicle 402. When anomaly detection system 200 is installed on other vehicles, including a first non-ego vehicle 400 (illustrated as non-ego vehicle in the first example 400A, non-ego vehicle in the second example 400B, non-ego vehicle in the third example 400C) and a second non-ego vehicle 404 (illustrated as non-ego vehicle in the first example 404A, non-ego vehicle in the second example 404B, non-ego vehicle in the third example 404C), similar measurements and vehicle operating rules may be applied.

At block 302, anomaly detection system 200 may monitor the use of the anomaly detection mechanism 210. For example, as illustrated in the first example 430 of FIG. 4, the anomaly detection system 200 installed on the ego vehicle 402A can monitor sensors 152 and vehicle systems 158 on the ego vehicle 402A and a non-ego vehicles 400A or 404A. The monitoring may include, for example, at least one of abnormal driving behavior (e.g., pausing, waiting more than a threshold distance between vehicles, swerving, changing lanes, etc.) or environment anomalies (e.g., fallen tree, potholes, etc.).

To perform the monitoring, anomaly detection mechanism 210 may communicate with one or more sensors 152 and/or vehicle systems 158. By monitoring the use of the anomaly detection mechanism 210, the anomaly detection system 200 may record metadata associated with the anomaly detection mechanism 210. The metadata may comprise sensor data, vehicle system data, accuracy data, observed parameters, behavior classification rules, location data, traffic signal states, vehicle speed, vehicle acceleration, vehicle proximity, or any other suitable data (generally referred to as metadata) for determining the accuracy of the anomaly detection mechanism 210.

As an illustrative example, anomaly analytics system 274 of vehicle systems 158 may interact with one or more sensors 152, including vehicle acceleration sensor 212, vehicle speed 214, or wheel sensor 216, to determine that the vehicle speed is accelerating within a predetermined threshold distance of a location associated with a traffic light, where the traffic light is identified by imaging sensor 222. In another example, anomaly analytics system 274 of vehicle systems 158 may interact with one or more sensors 152, including proximity sensor 224, to determine that the vehicle is approaching a traffic light, where the location of the traffic light is determined in a data store of known traffic light positions. These and other monitoring scenarios are provided for illustrative purposes only.

As shown with first example 430, ego vehicle 402A may determine that there is a distance between ego vehicle 402A and the two non-ego vehicles 400A and 400C that exceeds a threshold value (e.g., illustrating having a fluctuated distance to a collision). Based on the distance alone between ego vehicle 402A and non-ego vehicle 400A, an initial set of anomaly detection rules may identify that non-ego vehicle 400A is a distracted driver.

Similarly, in the second example 440, ego vehicle 402B may determine that there is a small distance to collision between ego vehicle 402B and front non-ego vehicle 404B since they are waiting in the traffic light.

In the third example 450, the traffic light turns to green and the follower non-ego vehicle 400C does not move and distance is getting larger. Having such a short distance followed by a large one (or vice versa) is conventionally considered distracted driving behavior (e.g., for the distance exceeding a threshold value) in a default anomaly detection system and corresponding anomaly detection logic. Here, anomaly detection system 200 may monitor the use of the anomaly detection mechanism for its analysis of follower non-ego vehicle 400C (block 302). For example, follower non-ego vehicle 400C does not enter the traffic light (since it may block the whole intersection) and anomaly detection mechanism 210 may generate an identification that follower non-ego vehicle 400C is distracted (even though in actuality, the driver is not likely distracted). Based on the distance alone between ego vehicle 402B and non-ego vehicle 400B, an initial set of anomaly detection rules may identify that non-ego vehicle 400B is a distracted driver. However, as discussed herein, this may be a false positive because it is normal driving behavior to allow extra space between vehicles at a stoplight. In this example, the initial set of anomaly detection rules may erroneously identify that non-ego vehicle 400B is a distracted driver.

In some examples, anomaly detection system 200 may communicate with backend system 290 that may also be in communication with other vehicles in the environment, including ego vehicle 402 and non-ego vehicles 400 or 404 to monitor the use of a plurality of anomaly detection mechanisms in each of these vehicles. The vehicle systems incorporated with each of these vehicles may provide information to backend system 290, which can process the information and distribute the information back to each of the vehicles that incorporate the anomaly detection system 200.

At block 304, anomaly detection system 200 may record metadata associated with the anomaly detection mechanism 210. Returning to the first example 430 of FIG. 4, the anomaly detection system 200 installed on the ego vehicle 402A can record metadata from the sensors and vehicle system regarding the non-ego vehicle 400A, which exceed the threshold values or ranges. The recorded metadata may be stored locally at ego vehicle 402A or remotely at backend system 290.

At block 306, anomaly detection system 200 may detect decreased performance of the anomaly detection mechanism. Returning to the first example 430 of FIG. 4, the anomaly detection system 200 installed on the ego vehicle 402A can provide sensor data from sensors 152 and vehicle analytics from vehicle systems 158 as input to a trained machine learning (ML) model implemented by the anomaly analytics system 274.

Anomaly analytics system 274 may receive the monitored data from sensors 152 and vehicle systems 158 and compare the data with preprogrammed threshold values and ranges. Particularly, some sensor data may be more correlated with identifying abnormal driving behavior (e.g., vehicle acceleration 212, vehicle speed 214, wheel sensor 216, lidar 220, imaging 222, proximity 224, timer 226, environmental 228, etc.), and the trained machine learning model or digital twin simulation implemented by anomaly analytics system 274 may assign a higher weight to that particular data. Output of the trained machine learning model or digital twin simulation may be compared with a virtual ground truth of the detection. The comparison between the output and the ground truth may determine if the identification of the anomaly is correct or incorrect/false. If it is false, anomaly analytics system 274 may further analyze the metadata and determine an improved anomaly detection logic. At block 308, the anomaly detection rules may be revised based on the output of the trained machine learning model or digital twin simulation implemented by anomaly analytics system 274. For example, the anomaly that is detected by anomaly analytics system 274 may be compared with the initial anomaly detection rules that identify anomalies in general. When the confidence score exceeds the threshold value, indicating inaccurate detection of an anomaly, anomaly detection mechanism 210 may update the anomaly analytics system 274 or initial anomaly detection rules for the particular location, situation, or other sensor data to change the indication from a detected anomaly to no anomaly (e.g., changing from abnormal driving behavior to normal driving behavior, etc.).

Anomaly analytics system 274 may also adjust the initial anomaly detection rules to generate adjusted anomaly detection rules based on consistently exceeded threshold values. These adjusted anomaly detection rules may be followed by the ego vehicle or other vehicles in future environments to better determine vehicle operations, as well as when generating future confidence scores based on the initial anomaly detection rules, parameters, and threshold values/ranges.

Anomaly analytics system 274 may also provide the adjusted anomaly detection rules to the backend system 290 to distribute to other vehicles and incorporate the new anomaly detection rules with those vehicles.

At block 310, anomaly detection system 200 may reuse the anomaly detection mechanism with the revised anomaly detection rules. In various embodiments, the anomaly detection system 200 can be repeated one or more times, or run continuously, such that the anomaly detection will be constantly adjusted.

In some examples, the revised anomaly detection rules may be created based on one or more simulations. For example, the anomaly detection mechanism 210 monitors a non-ego vehicle 400A and records metadata from the sensors 152 and vehicle system 158 regarding the non-ego vehicle 400A, which exceed the threshold values or ranges. The anomaly detection mechanism 210, then characterizes the non-ego vehicle 400A as having abnormal driving behavior, which is indicative of an anomaly.

This characterization with corresponding sensor data may be provided to one or more simulations associated with anomaly analytics system 274 of vehicle systems 158. However, since first example 430 takes place on an open highway, there are no conditions such as traffic lights or turns to skew the detection. Thus, the confidence scores from both simulations are the same, and the anomaly detection system 200 triggers an anomaly alarm or positive indicator.

In some examples, anomaly detection mechanism 210 may adjust the initial parameters and initial anomaly detection rules that the vehicle to perform automated operations in response to threshold values and ranges. As illustrated in FIG. 4, when the ego vehicle 402A is operating, it implements the adjusted threshold values and ranges and then compares the implemented threshold values and ranges to the previous threshold values and ranges to determine if the adjusted threshold values and ranges improved accuracy of the anomaly detection mechanism 210. The anomaly detection mechanism 210 may determine improved performance by monitoring output with the ground truth. If sensors 152 or vehicle systems 158 are still outside the threshold value or range when compared to the ground truth, the anomaly detection mechanism 210 will consider that incident abnormal. In various embodiments, the anomaly detection mechanism 210 is continuously running while the vehicle 102 is running. In other embodiments, the driver of the ego vehicle may manually activate the anomaly detection system by operating the manual switch 205.

The process illustrated in FIG. 3 can also be followed with the second example 440 of FIG. 4, where the anomaly detection system 200 on the ego vehicle 402B can determine a false positive of abnormal driving behavior on a non-ego vehicle 400B.

In the second example 440 of FIG. 4, the anomaly detection system 200 monitors the use of anomaly detection mechanism 210 (block 302) and records the metadata (block 304), as illustrated in first example 430. anomaly detection mechanism 210 may detect a decreased performance during the monitored use of the abnormal driving behavior mechanism 210 (block 306) and provide the data to one or more simulations associated with anomaly analytics system 274.

With each simulation, anomaly detection mechanism 210 may assume that the characterization of normal driving behavior or abnormal driving behavior is correct. For example, the first simulation assumes the characterization is correct, and the second simulation assumes that the driver's behavior is normal, but some external condition has affected accurate detection, for example, in second example 440, a traffic light.

Using anomaly analytics system 274, the anomaly detection system 200 can compare the output with the ground truth (e.g., normal driving behavior) or confidence values that the output correlates to a particular category (e.g., abnormal or normal). For example, the first simulation may have a medium to high confidence score since it observed a vehicle slowing down abnormally, but the second simulation may have a higher confidence score because it compares the data from the state of the traffic signals and compares it to the slowing non-ego vehicle 400B. The anomaly detection system then revises the anomaly detection rules based on the threshold values and ranges indicative of the presence of a traffic signal (block 308). Anomaly detection mechanism 210 can characterize the behavior as normal or abnormal based on whether it exceeds the threshold values. If the behavior is considered normal (within thresholds), the anomaly detection system 200 does not trigger warnings or positive indicators, however, if the anomaly detection mechanism 210 still characterizes the behavior as abnormal, twin simulations may again be run with the adjusted threshold values and ranges. If the confidence scores are the same, the anomaly detection system 200 can trigger positive detections of abnormal driving behavior. If the simulations are different beyond a threshold value, the anomaly detection mechanism 210 may be re-run with further adjusted threshold values and ranges (block 310). This process can be repeated (block 302) until normal driving is detected, or abnormal driving is detected with a threshold level confidence score.

In the third example 450 of FIG. 4, the anomaly detection system 200 on the ego vehicle 402C can determine a false positive when a non-ego vehicle 400C is slow to begin driving at a traffic signal. Similarly to second example 440, the use of the anomaly detection mechanism 210 can be monitored (block 302). This time, the non-ego vehicle 400C may not be distracted but may be waiting at the green traffic signal for ego vehicle 402C to move ahead and make room for non-ego vehicle 400C. The initial anomaly detection rules may characterize the non-ego vehicle 400C behavior as abnormal, and the digital twin simulations can produce above threshold confidence scores (or comparison to the ground truth) that the anomaly detection system 200 is detecting behavior that is abnormal, despite the situation/location being one of decreased accuracy. As such, the anomaly detection system 200 can record metadata associated with the anomaly detection mechanism 210 as being abnormal (block 304). The sensor data from sensors 152 or vehicle system 158 analytics may identify the environment of the traffic light as allowing delays by the vehicle until there is room for the vehicle on the other side of the intersection, leading to a likelihood of decreased performance (e.g., accurately identifying an anomaly) of the anomaly detection mechanism 210 (block 306). The revised anomaly detection rules may identify that the behavior of the non-ego vehicle 400C is not abnormal and the anomaly detection mechanism 210 may be re-run with the revised anomaly detection rules (block 310).

FIG. 5 provides an illustrative driving environment with a vehicle approaching a U-Turn opportunity, in accordance with some embodiments described herein. In each of these examples 520 and 530 of FIG. 5, the anomaly detection system 200 may be installed on ego vehicle 502 (illustrated as ego vehicle in the first example 502A and ego vehicle in the second example 502B). Anomaly detection system 200 can monitor sensors 152 and vehicle systems 158 on the ego vehicle 502. When anomaly detection system 200 is installed on other vehicles, including a first non-ego vehicle 500 (illustrated as non-ego vehicle in the first example 500A and non-ego vehicle in the second example 500B) and a second non-ego vehicle 504 (illustrated as non-ego vehicle in the first example 504A, non-ego vehicle in the second example 504B), similar anomaly detection rules may be applied.

In FIG. 5, the first non-ego vehicle 500 may be identified as having a delayed response with an increased distance between ego vehicle 502 and first non-ego vehicle 500B (e.g., above a threshold value). In conventional anomaly detection, the system may determine that the driver is likely distracted. In the U-turn illustration of example 530, the determination that the driver is distracted would be a false positive even though, at a U-turn, this distance is a safe maneuver because the driver in first non-ego vehicle 500 is to wait the preceding vehicles turn and before starting its U-turn maneuver. In anomaly detection system 200, the driver of ego vehicle 502 may be informed of the delayed response (block 302) and the driver rejects the notification (block 304). In this example, the metadata may comprise the location of the assumed anomaly, driver behaviors in each of the vehicles, and other relevant information. Anomaly detection system 200 may detect the decreased performance of the anomaly detection mechanism (e.g., identified from the rejected notification) (block 306) and revise the anomaly detection rules to not provide that notification in a similar situation or location in the future (block 308). The revised anomaly detection rules may be provided to each of the vehicles that incorporate anomaly detection system 200 therein (block 310).

FIG. 6 provides an illustrative driving environment with a vehicle approaching an intersection, in accordance with some embodiments described herein. In each of these examples 620 and 630 of FIG. 6, the anomaly detection system 200 may be installed on ego vehicle 602 (illustrated as ego vehicle in the first example 602A and ego vehicle in the second example 602B). Anomaly detection system 200 can monitor sensors 152 and vehicle systems 158 on the ego vehicle 602. When anomaly detection system 200 is installed on other vehicles, including a first non-ego vehicle 600 (illustrated as non-ego vehicle in the first example 600A and non-ego vehicle in the second example 600B) and a second non-ego vehicle 604B, similar anomaly detection rules may be applied.

At block 302 of the process illustrated in FIG. 3, anomaly detection system 200 may monitor the use of the anomaly detection mechanism 210. For example, as illustrated in the first example 620 of FIG. 6, the anomaly detection system 200 installed on the ego vehicle 602A can monitor sensors 152 and vehicle systems 158 on the ego vehicle 602A and a non-ego vehicle 600A.

At block 304, anomaly detection system 200 may record metadata associated with the anomaly detection mechanism 210. Returning to the first example 620 of FIG. 6, the anomaly detection system 200 installed on the ego vehicle 602A can record metadata from the sensors and vehicle system regarding the non-ego vehicle 600A, which exceed the threshold values or ranges. The recorded metadata may be stored locally at ego vehicle 502A or remotely at backend system 290.

The anomaly detection system 200 may monitor sensors 152 and vehicle systems 158 on the ego vehicle 602A. This monitoring may determine both metadata regarding the ego vehicle 602A and adjacent non-ego vehicle 600A. The anomaly detection mechanism 210 then compares the metadata from the sensors 152 and vehicle system 158 to threshold values and ranges and characterizes behavior of the ego vehicle 602A and non-ego vehicle 600A as normal, or abnormal if the data exceeds the threshold values or ranges.

This characterization may be run through two simulations. However, since the first example 620 of FIG. 6 takes place on an open highway, there are no conditions such as traffic lights or turns to skew the detection. Thus the confidence scores from both simulations are the same, and the anomaly detection system 200 triggers an abnormal driver alarm or positive indicator.

In a second example 630 of FIG. 6, the anomaly detection system on the ego vehicle 602B can determine a false positive of abnormal driving behavior on a vehicle 600B, similarly as described herein.

Figure 7:
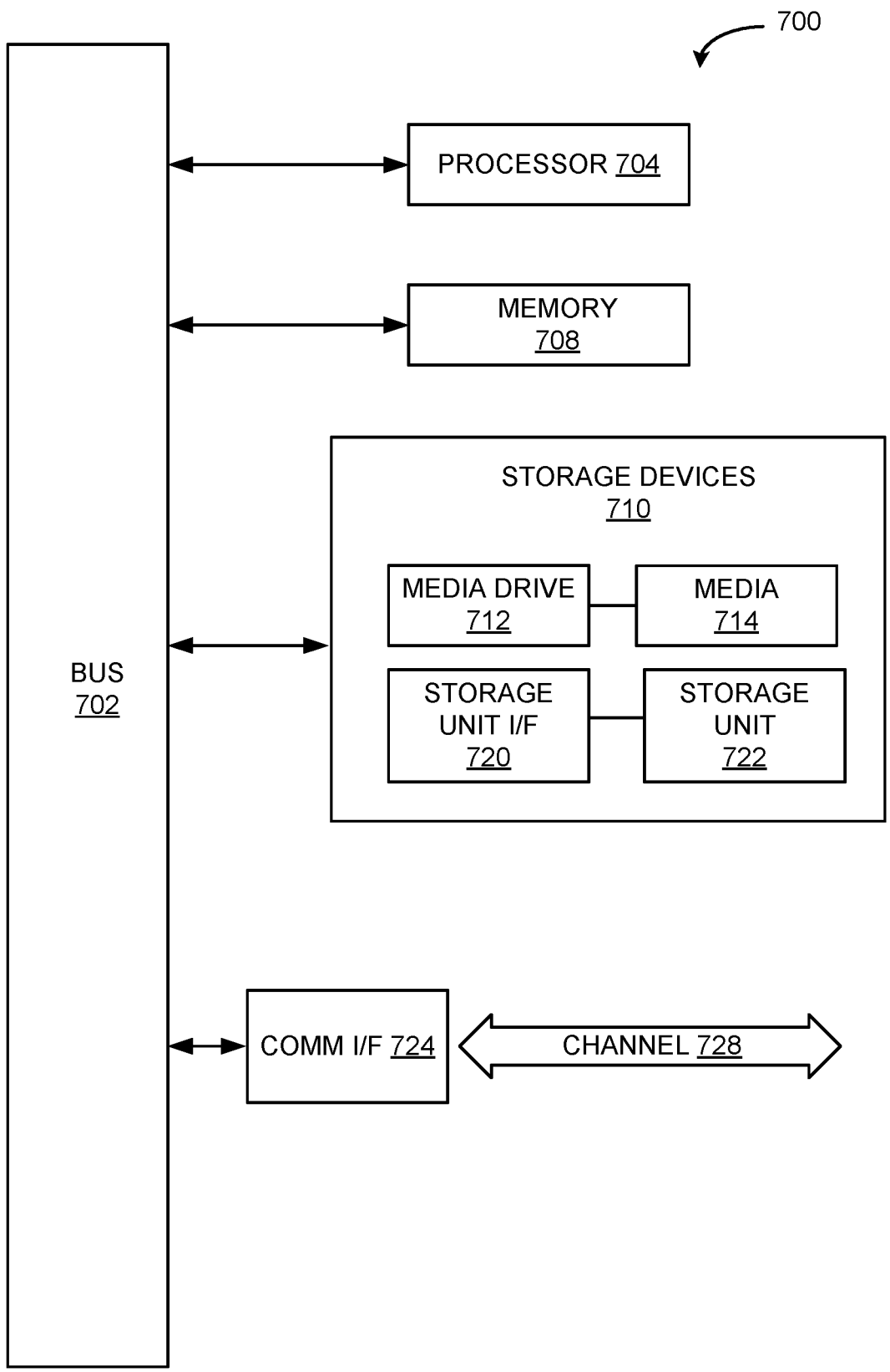
FIG. 7 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

FIG. 7 is an example computing component that may be used to implement various features of embodiments described in the present disclosure. Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up user device. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and a storage unit interface (I/F) 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or soft-modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 722 media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As it will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system to improve performance of anomaly detection in a vehicle, comprising:
   a memory; and
   one or more processors, wherein the one or more processors are configured to execute machine readable instructions stored in the memory for causing the one or more processors to:
   monitor use of an anomaly detection mechanism, wherein the anomaly detection mechanism detects at least one of abnormal driving behavior or environment anomalies;
   based on the monitoring, record metadata associated with the anomaly detection mechanism;
   compare the metadata associated with the anomaly detection mechanism to driving behavior performed by the vehicle;
   detect characteristic differences between the driving behavior performed by the vehicle and suggested vehicle operations in association with the anomaly detection,
   wherein the characteristic differences are measured in excess of a threshold value for a location or a situation known to cause inaccurate performance responses of the anomaly detection mechanism, and
   wherein the characteristic differences correspond with a decreased performance during monitored use of the anomaly detection mechanism;
   based on the characteristic differences exceeding the threshold value, revise an anomaly detection rule for the location or the situation known to cause the inaccurate performance responses; and
   reuse the anomaly detection mechanism with the revised anomaly detection rule.

2. The system of claim 1, wherein the one or more processors is continuously monitoring the anomaly detection mechanism when the anomaly detection mechanism is activated.

3. The system of claim 1, wherein the metadata are threshold values and ranges, observed parameters, behavior classification rules, or location data.

4. The system of claim 3, wherein the behavior classification rules are determined by one or more of defined behavior classification rules, vehicle location, vehicle situation, turn potential, vehicle proximity to stoplights, or defined parameters.

5. The system of claim 1, wherein the decreased performance during monitored use of the anomaly detection mechanism includes decreased accuracy or decreased detection time.

6. The system of claim 1, wherein revising the anomaly detection rule comprises revising parameters, thresholds, adding a new rule or removing a previous rule for the location or the situation.

7. A system to improve performance of anomaly detection in a vehicle comprising:
a memory; and
one or more processors, wherein the one or more processors are configured to execute machine readable instructions stored in the memory for causing the one or more processors to:
monitor use of an anomaly detection mechanism, wherein the anomaly detection mechanism detects at least one of abnormal driving behavior or environment anomalies;
based on the monitoring, record metadata associated with the anomaly detection mechanism;
detect decreased performance during monitored use of the anomaly detection mechanism, wherein the decreased performance is associated with a location or a situation known to cause inaccurate performance responses;
revise an anomaly detection rule for the location or the situation known to cause the inaccurate performance responses;
reuse the anomaly detection mechanism with the revised anomaly detection rule; and
implement a digital twin simulation to detect the decreased performance, wherein the digital twin simulation includes multiple simulations that are run with observed parameters and adjusted parameters to determine whether parameters require further adjustment.

8. The system of claim 7, wherein the decreased performance during monitored use of the anomaly detection mechanism includes decreased accuracy or decreased detection time.

9. The system of claim 7, wherein the digital twin simulation is run in a simulated environment in parallel with a same sensor data input from the vehicle to determine different outputs using the simulated environment.

10. The system of claim 7, wherein the machine readable instructions further cause the one or more processors to:
determine a distance that the vehicle will travel when the vehicle applies brakes at a first location versus a second location; and
use the distance determined in the digital twin simulation.

11. A system to improve performance of anomaly detection in a vehicle comprising:
a memory; and
one or more processors, wherein the one or more processors are configured to execute machine readable instructions stored in the memory for causing the one or more processors to:
monitor use of an anomaly detection mechanism, wherein the anomaly detection mechanism detects at least one of abnormal driving behavior or environment anomalies;
based on the monitoring, record metadata associated with the anomaly detection mechanism;
detect decreased performance during monitored use of the anomaly detection mechanism, wherein the decreased performance is associated with a location or a situation known to cause inaccurate performance responses;
revise an anomaly detection rule for the location or the situation known to cause the inaccurate performance responses;
reuse the anomaly detection mechanism with the revised anomaly detection rule; and
implement a digital twin simulation to detect the decreased performance, wherein the digital twin simulation includes multiple simulations that are run with behavior classification rules to determine whether the anomaly detection rule requires further adjustment.

12. The system of claim 11, wherein the decreased performance during monitored use of the anomaly detection mechanism includes decreased accuracy or decreased detection time.

13. The system of claim 11, wherein the digital twin simulation is run in a simulated environment in parallel with a same sensor data input from the vehicle to determine different outputs using the simulated environment.

14. The system of claim 11, wherein the machine readable instructions further cause the one or more processors to:
determine a distance that the vehicle will travel when the vehicle applies brakes at a first location versus a second location; and
use the distance determined in the digital twin simulation.

15. A computer-implemented method to improve performance of anomaly detection in a vehicle, the method comprising:
monitoring use of an anomaly detection mechanism by a computing system of the vehicle, wherein the anomaly detection mechanism detects at least one of abnormal driving behavior or environment anomalies;
based on the monitoring, recording metadata associated with the anomaly detection mechanism;
comparing the metadata associated with the anomaly detection mechanism to driving behavior performed by the vehicle;
detecting characteristic differences between the driving behavior performed by the vehicle and suggested vehicle operations in association with the anomaly detection,
wherein the characteristic differences are measured in excess of a threshold value for a location or a situation known to cause inaccurate performance responses of the anomaly detection mechanism, and
wherein the characteristic differences correspond with a decreased performance during monitored use of the anomaly detection mechanism;
based on the characteristic differences exceeding the threshold value, revising an anomaly detection rule for the location or the situation known to cause the inaccurate performance responses; and
reusing the anomaly detection mechanism with the revised anomaly detection rule.

16. The method of claim 15, wherein the method is continuously monitoring the anomaly detection mechanism when the anomaly detection mechanism is activated.

17. The method of claim 15, wherein the metadata are threshold values and ranges, observed parameters, behavior classification rules, or location data.

18. The method of claim 17, wherein the behavior classification rules are determined by one or more of defined behavior classification rules, vehicle location, vehicle situation, turn potential, vehicle proximity to stoplights, or defined parameters.

19. The method of claim 15, wherein the decreased performance during monitored use of the anomaly detection mechanism includes decreased accuracy or decreased detection time.

20. The method of claim 15, wherein revising the anomaly detection rule comprises revising parameters, thresholds, adding a new rule or removing a previous rule for the location or the situation.

21. A computer-implemented method to improve performance of anomaly detection in a vehicle, the method comprising:
monitoring use of an anomaly detection mechanism by a computing system of the vehicle, wherein the anomaly detection mechanism detects at least one of abnormal driving behavior or environment anomalies;
based on the monitoring, recording metadata associated with the anomaly detection mechanism;
detecting decreased performance during monitored use of the anomaly detection mechanism, wherein the decreased performance is associated with a location or a situation known to cause inaccurate performance responses;
revising an anomaly detection rule for the location or the situation known to cause the inaccurate performance responses;
reusing the anomaly detection mechanism with the revised anomaly detection rule; and
implementing a digital twin simulation to detect the decreased performance, wherein the digital twin simulation includes multiple simulations that are run with observed parameters and adjusted parameters to determine whether parameters require further adjustment.

22. The method of claim 21, wherein the decreased performance during monitored use of the anomaly detection mechanism includes decreased accuracy or decreased detection time.

23. The method of claim 21, wherein the digital twin simulation is run in a simulated environment in parallel with a same sensor data input from the vehicle to determine different outputs using the simulated environment.

24. The method of claim 21, further comprising
determining a distance that the vehicle will travel when the vehicle applies brakes at a first location versus a second location; and
using the distance determined in the digital twin simulation.

25. A computer-implemented method to improve performance of anomaly detection in a vehicle, the method comprising:
monitoring use of an anomaly detection mechanism by a computing system of the vehicle, wherein the anomaly detection mechanism detects at least one of abnormal driving behavior or environment anomalies;
based on the monitoring, recording metadata associated with the anomaly detection mechanism;
detecting decreased performance during monitored use of the anomaly detection mechanism, wherein the decreased performance is associated with a location or a situation known to cause inaccurate performance responses;
revising an anomaly detection rule for the location or the situation known to cause the inaccurate performance responses;
reusing the anomaly detection mechanism with the revised anomaly detection rule; and
implementing a digital twin simulation to detect the decreased performance, wherein the digital twin simulation includes multiple simulations that are run with behavior classification rules to determine whether the anomaly detection rule requires further adjustment.

26. The method of claim 25, wherein the decreased performance during monitored use of the anomaly detection mechanism includes decreased accuracy or decreased detection time.

27. The method of claim 25, wherein the digital twin simulation is run in a simulated environment in parallel with a same sensor data input from the vehicle to determine different outputs using the simulated environment.

28. The method of claim 25, further comprising
determining a distance that the vehicle will travel when the vehicle applies brakes at a first location versus a second location; and
using the distance determined in the digital twin simulation.

29. A non-transitory computer-readable storage medium storing a plurality of instructions executable by one or more processors, the plurality of instructions when executed by the one or more processors cause the one or more processors to:
monitor use of an anomaly detection mechanism, wherein the anomaly detection mechanism detects at least one of abnormal driving behavior or environment anomalies;
based on the monitoring, record metadata associated with the anomaly detection mechanism;
compare the metadata associated with the anomaly detection mechanism to driving behavior performed by a vehicle;
detect characteristic differences between the driving behavior performed by the vehicle and suggested vehicle operations in association with the anomaly detection,
wherein the characteristic differences are measured in excess of a threshold value for a location or a situation known to cause inaccurate performance responses of the anomaly detection mechanism, and
wherein the characteristic differences correspond with a decreased performance during monitored use of the anomaly detection mechanism;
based on the characteristic differences exceeding the threshold value, revise an anomaly detection rule for the location or the situation known to cause the inaccurate performance responses; and
reuse the anomaly detection mechanism with the revised anomaly detection rule.

30. The non-transitory computer-readable storage medium of claim 29, wherein the one or more processors is continuously monitoring the anomaly detection mechanism when the anomaly detection mechanism is activated.

31. The non-transitory computer-readable storage medium of claim 29, wherein the metadata are threshold values and ranges, observed parameters, behavior classification rules, or location data.

32. The non-transitory computer-readable storage medium of claim 31, wherein the behavior classification rules are determined by one or more of defined behavior classification rules, vehicle location, vehicle situation, turn potential, vehicle proximity to stoplights, or defined parameters.

* * * * *